Oct. 22, 1968 H. W. VERLINDEN 3,407,365
HYBRID RING MODULATOR
Filed June 1, 1965
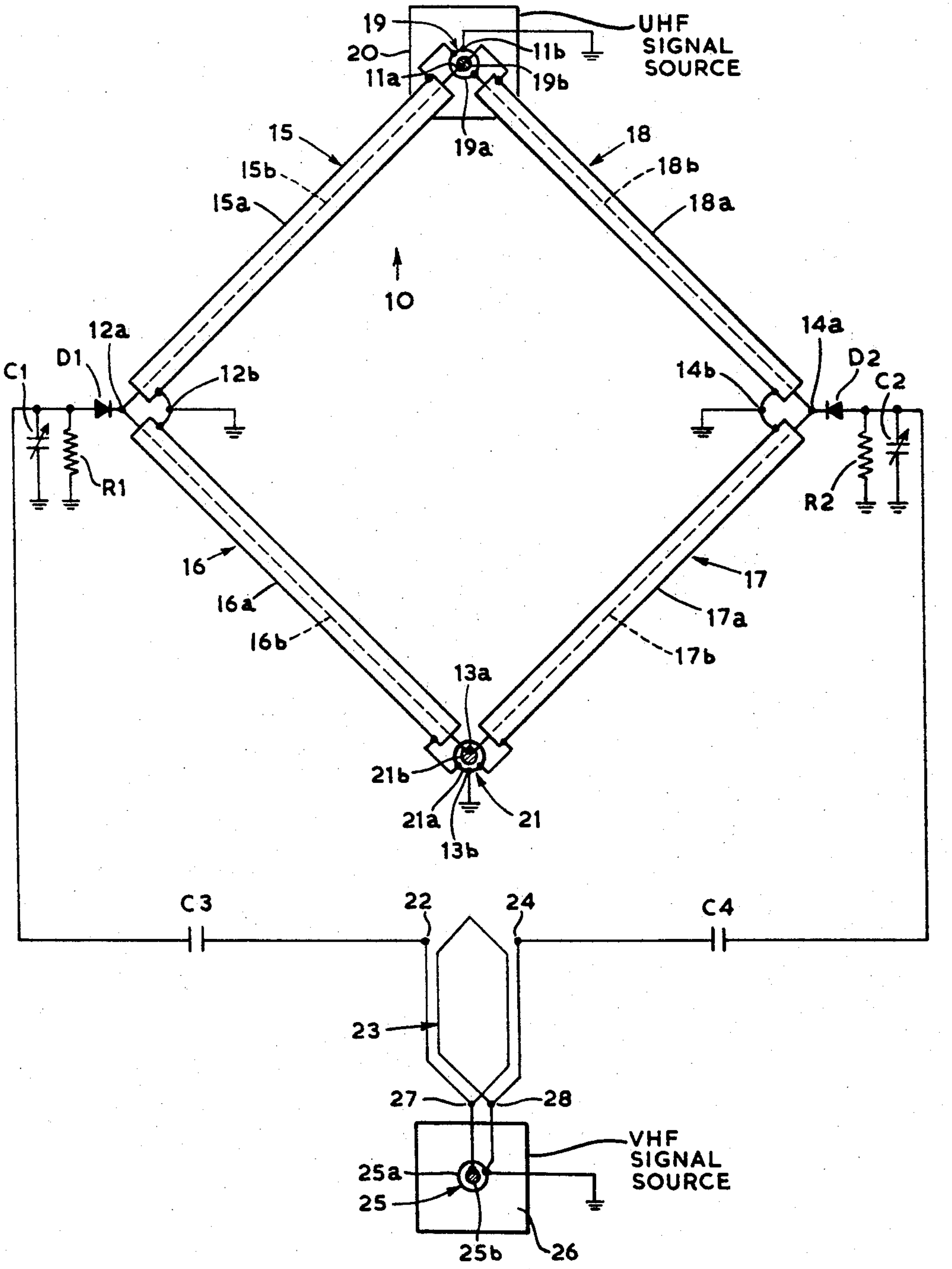
INVENTOR.
HARRY W. VERLINDEN
BY
PATENT AGENT United States Patent Office 3,407,365
Patented Oct. 22, 1968

3,407,365
HYBRID RING MODULATOR
Harry W. Verlinden, Waterloo, Ontario, Canada, assignor to Electrohome Limited, a corporation of Canada
Filed June 1, 1965, Ser. No. 460,595
9 Claims. (Cl. 332—23)

ABSTRACT OF THE DISCLOSURE

A balanced modulator includes a hybrid ring with four pairs of terminals arranged in consecutive order around the ring, the four arms of the hybrid ring being of the same length and characteristic impedance. One terminal of each pair is connected to a common potential. A signal is applied to the other terminal of the first pair. Modulating signals are applied to the other terminals of the second and fourth pairs via variable resistance diodes, the modulating signals being the same except 180° out of phase with respect to each other.

This invention relates to a balanced modulator. More particularly, this invention relates to a balanced modulator employing a hybrid ring.

The modulation of a UHF input signal with a VHF signal to produce a UHF output signal of different frequency than the input signal has been accomplished in the past using "tube" circuits. For the most part such circuits are relatively complicated and expensive, and produce a UHF output signal that must be filtered to remove the UHF input signal and amplified.

In accordance with this invention modulation of a UHF input signal by a VHF signal to produce a UHF output signal is accomplished by a circuit employing a hybrid ring. A modulator embodying this invention is balanced, i.e., the UHF input signal does not appear in the output, so that filtering of the output signal is not required. Moreover, the circuit is relatively simple and inexpensive, and a high level UHF output signal can be obtained.

In brief, in accordance with this invention, there is provided a balanced modulator that includes a hybrid ring having first, second, third and fourth pairs of terminals arranged in consecutive order around the hybrid ring with each of the pairs of terminals separated from adjacent ones of the pairs of terminals by arms of the hybrid ring having the same length and characteristic impedance. Means are provided connecting one of each of the pairs of terminals to a common potential, e.g., ground potential. Means are provided for applying a signal, e.g., a UHF signal, to the other terminal of the first pair of terminals. A first variable resistance diode, the resistance of which is voltage dependent, is connected to the other terminal of the second pair of terminals, while a second variable resistance diode, the resistance of which also is voltage dependent, is connected to the other terminal of the fourth pair of terminals to conduct current between the second diode and the aforementioned other terminal of the fourth pair of terminals in the same direction as current is conducted between the first diode and the aforementioned other terminal of the second pair of terminals. Means also are provided for applying a modulating signal, e.g., a VHF signal, to the two diodes, the modulating signal applied to the first diode being 180° out of phase with but otherwise the same as the modulating signal applied to the second diode.

This invention will become more apparent from the following detailed description, taken in conjunction with the appended drawing which schematically illustrates a modulator embodying this invention.

Referring to the drawing, there is shown a modulator that includes a hybrid ring 10 having pairs of terminals

11*a*, 11*b*, 12*a*, 12*b*, 13*a*, 13*b*, 14*a* and 14*b* arranged in consecutive order around the ring. The various pairs of terminals are separated from adjacent pairs of terminals by arms 15, 16, 17 and 18 of the hybrid ring, each arm being of the same length and characteristic impedance as the other arms. While arms 15 to 18 inclusive are shown as being coaxial cables, those skilled in the art will appreciate that the coaxial cables may be replaced with twin lead. The coaxial cables have outer sheaths 15*a*, 16*a*, 17*a* and 18*a* respectively and inner conductors 15*b*, 16*b*, 17*b* and 18*b* respectively.

A coaxial cable 19 having an outer sheath 19*a* and an inner conductor 19*b* is connected to a UHF signal source 20. A coaxial cable 21 having an outer sheath 21*a* and an inner conductor 21*b* is provided for the UHF output signal from the modulator.

The arms of ring 10 are connected conventionally. Conductors 15*b*, 16*b*, 17*b* and 18*b* are connected in series with conductor 18*b* being connected to sheath 19*a*. Sheath 19*a* is connected to sheath 15*a*, which is connected to sheath 16*a*. Sheath 16*a* is connected to sheath 17*a* via sheath 21*a*, and sheath 17*a* is connected to sheath 18*a*, which, in turn, is connected to conductor 19*b*. Conductor 19*b* and conductor 15*b* are connected together.

Terminals 11*b*, 12*b*, 13*b* and 14*b* are connected to a common potential, more specifically, and as shown in the figure, to ground.

A variable resistance diode D1 has its cathode connected to terminal 12*a* and its anode connected to one terminal of a blocking capacitor C3, the other terminal of which is connected to one output terminal 22 of a VHF balun 23. The common terminal of capacitor C3 and diode D1 is connected to ground through the parallel connected combination of a resistor R1 and a variable capacitor C1.

A variable resistance diode D2 of the same type as diode D1 has its cathode connected to terminal 14*a* and its anode connected to one terminal of a blocking capacitor C4, the other terminal of which is connected to the other output terminal 24 of balun 23. The common terminal of capacitor C4 and diode D2 is connected to ground through the parallel connected combination of a resistor R2 and a variable capacitor C2. Capacitors C4 and C2 and resistor R2 are the same as capacitors C3 and C1 and resistor R1 respectively.

A coaxial cable 25 having an outer sheath 25*a* and an inner conductor 25*b* is connected to a VHF signal source 26. Sheath 25*a*, which is grounded, is connected to one input terminal 28 of balun 23, while conductor 25*b* is connected to the other input terminal 27 of the balun.

Capacitors C1 and C2 are sized so as to present substantially zero impedance to the UHF signal from source 20 but appreciable impedance to the VHF modulating signal from source 26. Capacitors C1 and C2 may be adjusted, if necessary, to ensure that the UHF signal applied across terminals 11*a* and 11*b* does not appear in the output across terminals 13*a* and 13*b*. Resistors R1 and R2 provide a DC path to ground so that capacitors C1 and C2 can discharge to ground rather than baising diodes D1 and D2 so that these diodes could not follow the VHF modulating signal. Capacitors C3 and C4 simply serve a blocking function.

In operation, if there is no VHF modulating signal applied to terminals 12*a* and 14*a* but a UHF signal is applied to terminal 11*a*, there will be no output signal between terminals 13*a* and 13*b*, because the signals received at terminals 13*a* and 13*b* from the two sides of the hybrid ring will be of equal level because of equal loading at terminals 12*a* and 14*a* and out of phase and will cancel. When source 26 is energized, however, VHF modulating signals which are 180° out of phase with respect to each other, but otherwise identical, are applied to the anodes of diodes D1 and D2. The modulating signals unbalance the loading at terminals 12*a* and 14*a* in opposite directions to each other and therefore unbalance the hybrid ring, and modulation of the UHF signal with the VHF signal from source 26 results. The output signal obtained across terminals 13*a* and 13*b* consists of the sum and difference of the UHF and VHF input signals and is a UHF signal free of the original UHF input signal.

It should be noted that other circuits than those disclosed herein may be employed to apply the 180° out of phase but otherwise identical modulating signals to diodes D1 and D2.

By varying the frequency of the signal generated by source 20, which may be an oscillator, for example, UHF output signals of different frequencies can be obtained.

While this invention has been described in connection with a UHF signal input, this is not essential, and the modulator may be used for conversion of other frequencies. Thus, source 20 may produce a VHF signal. It will be appreciated, of course, that the length of the arms of the bridge is determined by the frequency of the signal from source 20. Thus, for a signal having a frequency of 200 mc., the arms would be longer than for a signal having a frequency of 400 mc.

While preferred embodiments of this invention have been disclosed herein, those skilled in the art will appreciate that changes and modifications may be made therein without departing from the spirit and scope of this invention as defined in the appended claims.

What I claim as my invention is:

1. A balanced modulator comprising a hybrid ring having first, second, third and fourth pairs of terminals arranged in consecutive order around said ring with each of said pairs of terminals separated from adjacent ones of said pairs of terminals by arms of said hybrid ring of the same length and having the same characteristic impedance; means connecting one of each of said pairs of terminals to a common potential; means for applying a signal to the other terminal of said first pair of terminals; a first variable resistance diode connected to the other terminal of said second pair of terminals; a second variable resistance diode connected to the other terminal of said fourth pair of terminals to conduct current between said second diode and said other terminal of said fourth pair of terminals in the same direction as current is conducted between said first diode and said other terminal of said second pair of terminals; and means for applying a modulating signal to both of said diodes, the modulating signal applied to said first diode being 180° out of phase with but otherwise the same as the modulating signal applied to said second diode.

2. A balanced modulator according to claim 1 wherein said arms of said hybrid ring are coaxial cables.

3. A balanced modulator according to claim 1 wherein said common potential is ground potential.

4. A balanced modulator according to claim 1 wherein said signal applied to said other terminal of said first pair of terminals is a UHF signal.

5. A balanced modulator according to claim 1 wherein said modulating signal is a VHF signal.

6. A balanced modulator according to claim 1 wherein said means for applying said modulatng signal includes a balun having two output terminals, one of said output terminals being connected to said first diode, the other of said output terminals being connected to said second diode.

7. A balanced modulator according to claim 1 wherein said means for applying said modulating signal includes a balun having two output terminals, a first capacitor connected in series between one of said output terminals of said balun and said first diode, a first resistor and a second capacitor connected in parallel between said common potential and the common terminal of said first capacitor and said first diode, a third capacitor connected in series between the other of said output terminals of said balun and said second diode, a second resistor and a fourth capacitor connected in parallel between said common potential and the common terminal of said third capacitor and said second diode, said second and fourth capacitors being sized to present a low impedance to said signal applied to said other terminal of said first pair of terminals and a high impedance to said modulating signal, said diodes each having an anode and a cathode, said cathodes of said first and second diodes being connected to said other terminals of said second and fourth pairs of terminals respectively.

8. A balanced modulator according to claim 7 wherein said common potential is ground potential.

9. A balanced modulator according to claim 1 wherein said diodes each have an anode and a cathode, said cathodes of said first and second diodes being connected to said other terminals of said second and fourth pairs of terminals respectively.

References Cited

UNITED STATES PATENTS 2,514,678 7/1950 Southworth ---------- 332—54

ROY LAKE, *Primary Examiner.*

L. J. DAHL, *Assistant Examiner.*